US010416310B2

(12) United States Patent
Kirchner et al.

(10) Patent No.: US 10,416,310 B2
(45) Date of Patent: Sep. 17, 2019

(54) INTEGRATED POSITIONING SOLUTION FOR GLOBAL NAVIGATION SATELLITE SYSTEMS

(75) Inventors: Michael Kirchner, Munich (DE); Tanja Rang, Grasbrunn (DE); Hans L. Trautenberg, Ottobrunn (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 753 days.

(21) Appl. No.: 12/138,722

(22) Filed: Jun. 13, 2008

(65) Prior Publication Data
US 2009/0322602 A1 Dec. 31, 2009

(30) Foreign Application Priority Data
Jun. 13, 2007 (EP) ................................ 07011582

(51) Int. Cl.
*G01S 19/02* (2010.01)
*G01S 19/05* (2010.01)
*G01S 19/08* (2010.01)
*G01S 19/33* (2010.01)
*B64G 1/36* (2006.01)

(52) U.S. Cl.
CPC .............. *G01S 19/02* (2013.01); *G01S 19/05* (2013.01); *G01S 19/08* (2013.01); *G01S 19/33* (2013.01); *B64G 1/36* (2013.01)

(58) Field of Classification Search
CPC .......... G01S 19/02; G01S 19/05; G01S 19/08; G01S 19/33
USPC ............. 342/357.01, 357.06, 357.15, 357.16
See application file for complete search history.

(56) References Cited

U.S. PATENT DOCUMENTS

| 5,153,598 | A | 10/1992 | Alves, Jr. |
| 5,436,632 | A * | 7/1995 | Sheynblat ............... 342/357.64 |
| 6,023,239 | A * | 2/2000 | Kovach ................... G01S 5/009 342/357.44 |
| 6,603,426 | B1 * | 8/2003 | Clark ...................... G01S 19/10 342/357.64 |
| 6,829,535 | B2 | 12/2004 | van Diggelen et al. |
| 6,850,187 | B1 * | 2/2005 | Clark ...................... 342/357.06 |
| 7,095,368 | B1 | 8/2006 | van Diggelen |
| 8,094,069 | B2 | 1/2012 | Rang et al. |
| 2002/0190898 | A1 | 12/2002 | Abraham et al. |

(Continued)

FOREIGN PATENT DOCUMENTS

| DE | 10 2007 006 612.2 | 8/2008 | |
| WO | WO 9918677 A1 * | 4/1999 | ............ H04B 7/155 |

OTHER PUBLICATIONS

"Galileo Mission High Level Definition" Sep. 23, 2002 European Commission, esa.*

(Continued)

*Primary Examiner* — Cassi J Galt
(74) *Attorney, Agent, or Firm* — Greenblum & Bernstein, P.L.C.

(57) ABSTRACT

The invention includes a process for one's own global navigation satellite system and at least one other global navigation satellite system including the following: Receiving ranging signals and navigation messages or ranging signals only from the at least one other global navigation satellite system, and processing the received ranging signals and navigation messages in a similar way as the ranging signals and navigation messages of the owned global navigation satellite system.

5 Claims, 1 Drawing Sheet

(56) References Cited

U.S. PATENT DOCUMENTS

2004/0248559 A1* 12/2004 Trautenberg ............... 455/412.1
2006/0083293 A1*  4/2006 Keegan ................... G01S 19/22
                                                           375/148
2010/0013705 A1*  1/2010 Syrjarinne et al. ...... 342/357.09

OTHER PUBLICATIONS

J. Ventura-Traveset, P. Michel and L. Gauthier, Signal Processing Aspects of the EGNOS System: the first European Implementation of GNSS, Seventh International Workshop on Digital Signal Processing Techniques for Space Communications, DSP 001, Sesimbra, Portugal, Oct. 1-3, 2001.*
McCasland et al., Open System Arch. for Dual-Use Satellite Navg't'n, Aerosp Conf. Proc'dgs, Mar. 18-25, 2000, Piscataway, NJ, IEEE vol. 11, Feb. 1 2000, pp. 99-100, XP010518465.
Leonard et al., GPS and GALILEO Interoperability and Synergies, Proc'd'gs of the Institute of Navigation GPS 2002, Sep. 24, 2002, Portland, OR, pp. 330-341, XP002432850.
Spacek et al., GNSS Signal Monitoring Station, 2007 17th International Conference Radioelektronika, Apr. 24, 2007, XP002458957.

* cited by examiner

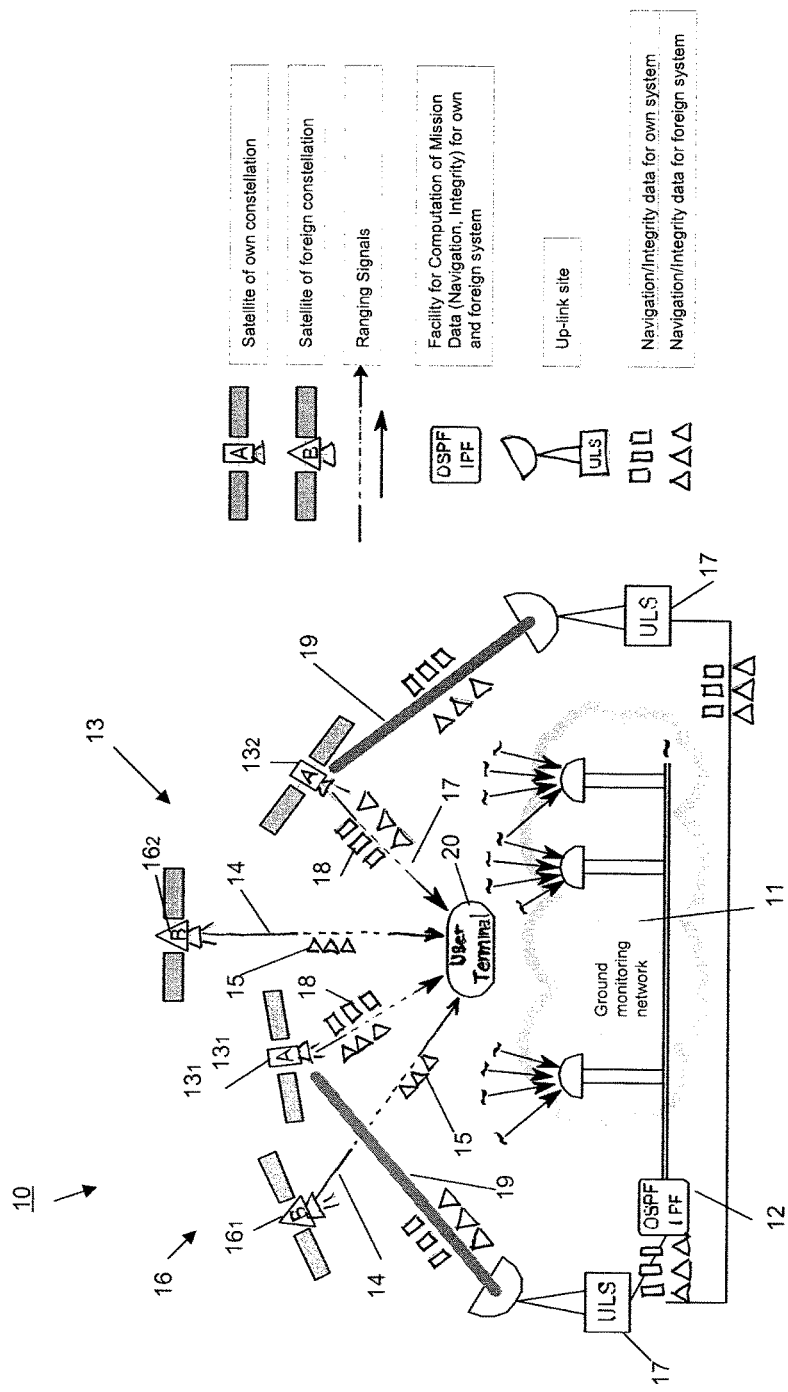

INTEGRATED POSITIONING SOLUTION FOR GLOBAL NAVIGATION SATELLITE SYSTEMS

BACKGROUND OF THE INVENTION

1. Field of the Invention

The invention relates to an integrated positioning solution for global navigation satellite systems (GNSS) and especially relates to the dissemination of ephemeris, clock and navigation data for foreign navigation satellites via satellites of an operator's navigation system, and further relates to the seamless integration of ranging signals of other (foreign) GNSS into the operator's satellite navigation system.

2. Description of Background and Other Information

GNSS receivers (user segment) determine the pseudo ranges to satellites orbiting the earth via measurements of the pseudo signal propagation time between transmission at the satellite, in the physical timescale of the satellite and reception at the receiver in the timescale of the receiver. If the positions of the satellites and the offsets of the physical time scales of the individual satellites relative to the system time scale are known, the position of the receiver and the offset of the receiver time scale to the system time scale can be computed using pseudo ranges measured to several (at least four) satellites.

As the positions of the satellites change with time, the receiver needs a description of those changes as a function of time. Furthermore, the time stamp on the signals, which allows the measurement of the signal propagation times, refers to the individual physical time scales of the satellites and need to be related to the system time scale.

To combine the measurements to satellites of one system, the receiver must know the individual offsets between system time scale and physical time scale of all respective satellites. The information of the satellite position—or, more specifically, the position of the satellite's electromagnetic antenna phase center for each emitted signal—is given by the ephemeris; the information of the time scale offsets is given by the satellite clock parameters.

Both kinds of parameters are part of the navigation message transmitted by each individual satellite as an amendment of the ranging signal. These data are modulated on top of the navigation ranging signal. Only the combined use of all information—ranging signals to several satellites together with the respective navigation data (ephemeris and clock parameters and some other parameters describing the properties of the ranging signals)—make position determination of the receiver and hence navigation possible.

The ground-based monitoring network of a GNSS and dedicated data processing facilities (ground segment) are used to determine the parameters necessary for navigation. Beside the parameters essential for positioning like orbits and clocks, there are further parameters which enhance navigation or enable specific services, such as broadcast signal delay and integrity information. All parameters are determined and—as far as possible—predicted by the processing facilities and up-linked to the satellites for dissemination together with the ranging signal.

The description of the present invention is given from the point of view of an operator of a satellite navigation system (GNSS). It distinguishes between the "owned" system to which the operator or provider has usually full access, and "foreign" or "other" systems to which the operator has no access or only very limited access.

Different GNSS (like GPS, GLONASS, Galileo and COMPASS) are designed and are operated independently. This independence also refers to the determination of the navigation parameters. In principle, however, a user receiver is able to provide a better (in terms of more accurate and more reliable) positioning solution by combining measurements to satellites of different GNSS, if the time offsets of the systems and possible offsets and scaling factors of the geodetic reference systems can be determined from additional pseudo range measurements to a multitude of satellites.

The use of pseudo range measurements to satellites of different GNSS for an integrated (combined) position solution, where less than the number of satellites of a foreign system necessary to determine the above mentioned offsets and scaling parameters are used in the position solution, is very desirable.

Enabling the use of other satellites for positioning usually increases the number of satellites in view by a user, so that the user can select the satellites used to give optimal performance, as described in patent application DE 10 2007 006 612.2-35. Especially in areas for which a common view of four satellites of one system is hardly possible due to too many obstructions, the usable availability of satellites of other constellations will increase the probability of having more or even sufficient sources of navigation signals available.

To reduce the complexity of an inter-system combined positioning at user receiver level several features of the design of the systems are needed. Some of these are already foreseen to be implemented by the current GPS and planned Galileo design.

The representation of the navigation parameters for Galileo is the same as those for GPS. The terrestrial reference system used as origin of the coordinate system is defined similar to that used by GPS in a way that the user is affected negligibly.

A common reference of the system time scales is a crucial point. Since an establishment of a common reference for the system time, however, contradicts the system independence, such a common reference to come into existence is very unlikely. Nevertheless, it is essential for an integrated positioning solution. To overcome this limitation, GPS and Galileo are going to disseminate the system time difference between both systems in their navigation messages (cf. IS-GPS-200D Sec. 30.3.3.8.1 and GAL-OS-SIS-ICD/D.0 Sec. 10.1.2.7).

However, this solves only a part of the problem since only one inter-system parameter is addressed (system time offset). Other system differences like the different terrestrial reference systems and algorithms used to compute the navigation parameters are not covered but affect the accuracy and especially the integrity of the user's positioning solution.

The augmentation systems EGNOS and WAAS distribute differential corrections for GPS. These can be used to improve the accuracy and integrity of GPS-based positions within the limited service areas of these augmentation systems. The corrections are partly (for the ionosphere) disseminated not referring to a specific satellite but are mapped to a grid on the Earth's surface. Orbital and temporal corrections for every navigation satellite are provided by the data dissemination satellites of the respective augmentation system. This has the drawback that a high bandwidth is necessary to disseminate the information for all satellites in the service area within one data stream.

The dissemination of the GPS-Galileo system time difference enables a basic interoperability of the systems for the common user of the open service, where no service guarantees are provided. The professional user will most likely not benefit from this basic interoperability because he relies on a guaranteed reliability of services (accuracy, integrity). Since the knowledge of the quality of navigation parameters provided by a foreign system for the foreign system is usually very limited by the operator of the own system, no service guarantees can, thus, be provided to those professional users for a navigation solution incorporating also measurements to foreign satellites.

For some situations, the monitoring network and the processing facilities of a GNSS need to be capable of handling measurements of foreign GNSS. For GNSS receivers used in the ground monitoring network, this is nowadays usually the case and some GNSS of the prior art record the ranging signals and the navigation messages of foreign GNSS. However, these GNSS do not use the recorded data for further processing.

Combined GPS/GLONASS receivers are already on the market, and combined GPS/Galileo receivers are under development. GPS/Galileo receivers will soon be available and are foreseen to be used in the Galileo monitoring network. Receiver technologies integrating the capability of all three systems can be expected soon and further GNSS are assumed to be implemented quickly in the future. Hence, receiver technology is not a limiting factor.

The basics of satellite navigation used by different GNSS (ranging code concepts, frequencies used, satellite constellations) are very similar and so are the user processing algorithms.

For the algorithms to derive the ephemeris and time corrections this is not necessarily the case. GPS, for example, relies on Kalman filters to determine the orbits and clocks, whereas Galileo uses batch least square fits to solve the same problem. In GLONASS the Earth orientation parameters are estimated within the control segment, whereas GPS uses the predictions provided by IERS Paris.

SUMMARY OF THE INVENTION

The present invention is directed to an improved integration of ranging signals of foreign GNSS into an owned GNSS. More particularly, the invention encompasses a process, a system, and an apparatus.

One of the main features of the present invention is that the integration of the ranging signals of foreign GNSS into the owned GNSS is seamless, i.e., from a user's point of view, measurements of signals of foreign GNSS are processed in a similar way as the measurements of signals of the owned GNSS.

Seamless integration can provide for certain service guarantees and, hence, can serve professional user groups. For seamless integration of ranging signals of several navigation systems, it is necessary to use the same concepts, i.e., the measurements of signals of foreign GNSS are processed in the same way to determine the navigation messages or parts of it, as the measurements of signals of the owned GNSS (to use the same reference systems for coordinates and time, the same algorithms, and assumptions like measurement accuracy).

One advantage of the present invention is that as the range signals and the navigation messages of the foreign GNSS are processed by the owned GNSS, i.e., only one concept is used for the generation of navigation data for all satellite constellations, there is no degradation of accuracy caused by different reference systems, data representation, system algorithms, and user algorithms.

As a consequence, another advantage of the present invention is that the operator of the "own" or "owned" system can give service guarantees in terms of accuracy and integrity of the ranging service not only for the "own" or "owned" system, but also for the foreign systems.

A further advantage of the present invention is that it is possible to include ranging signals of foreign systems which provide only encrypted navigation data or no navigation data at all. The only precondition for this is that the system provides an accessible ranging signal with time tagging. According to the present invention, necessary navigation data can be provided by the owned system for those signals.

An additional advantage of the present invention is that an integration of measurement data of different GNSS into the processing algorithms requires only minor changes thereof to cope with certain particularities of the individual GNSS (such as FDMA of GLONASS or C/A-Code ambiguity of GPS). With those preconditions, i.e., that the monitoring and processing facilities are capable of collecting range measurements and generate/compute and distribute the navigation data, it is possible to provide the user not only with navigation data of the "own" GNSS, but also with data of other (foreign) GNSS.

DETAILED DESCRIPTION OF THE INVENTION

Each GNSS relies on a ground monitoring network and processing facilities in order to determine the above mentioned navigation parameters relevant for the user.

BRIEF DESCRIPTION OF THE DRAWINGS

The FIGURE illustrates an exemplary embodiment of an integrated positioning solution for a global navigation satellite system.

USAGE OF NAVIGATION DATA OF FOREIGN GNSS

According to one embodiment of the present invention, the owned GNSS 13 processes the ranging signals 14 and the data provided by the navigation messages 15 of foreign GNSS 16 in a similar way as the owned GNSS 13 processes its own ranging signals 17 and navigation messages 18. Further, the owned GNSS 13 disseminates the determined navigation data 19 to the satellites $13_1$, $13_2$ of the own GNSS 13.

The collected measurements of other systems 16 are fed into the orbit determination, time synchronization and integrity computation facilities 12 of the owned GNSS 13. While the orbit determination can be done independently for the systems (as long as the same reference frame is used), time synchronization has to be performed commonly. This does not exclude the possibility of building the time reference as a common clock with only clocks of the owned system 13.

The situation is slightly different for integrity computations. This facility 12 computes the integrity for all signals and signal combinations for all individual satellites $13_1$, $13_2$, $16_1$, $16_2$ of the individual systems 13, 16. This allows that the users compute a position solution with integrity for situation in which he would not have sufficient satellites of an individual system in view.

As a result of the process, the facilities 12 of the owned system 13 compute navigation data 18 for all other GNSS in the same way as it is done for the owned system 13. The same way refers to the use of identical computation algorithms (as far as possible, see above), provision of identical parameters (ephemeris, clock corrections, hardware signal delays, integrity information) in a format suited to be included in the navigation message 19. By this it is ensured that the user does not affect any difference in the process of decoding and using the parameters in the navigation message 19. The representation of the navigation data 18 generated for foreign satellites $16_1$, $16_2$ might be in a different format to allow a reduced amount of data compared to the navigation data 15 of the owned system 13. The reduced amount of data might require that the navigation information of the foreign satellites $16_1$, $16_2$ has to be updated, more frequently than for the owned satellites $13_1$, $13_2$.

Dissemination to Receivers of the "Owned" GNSS

It is described above that the navigation message 19 (determined by the processing facility 12) for each satellite $13_1$, $13_2$ is up-loaded to the respective satellite via an up-link site 17 and disseminated by the satellite to the user receivers 20. Obviously, this is not possible for satellites $16_1$, $16_2$ of foreign systems 16 since no mission data up-link access to the foreign satellites $16_1$, $16_2$ is possible. To overcome this limitation, the generated navigation data 19 are disseminated by the satellites $13_1$, $13_2$ of the owned constellation 13. This means that the satellites $13_1$, $13_2$ of the owned constellation 13 do not only transmit their individual navigation data 15 but also the data 18 for certain foreign satellites $16_1$, $16_2$. The data dissemination should be done in a way that the owned satellites $13_1$, $13_2$ transmit the data for several neighboring foreign satellites $16_1$, $16_2$.

The present invention is not limited to the case where the navigation data is disseminated by satellites. According to the present invention the navigation data can also be disseminated via terrestrial communication links (e.g., GSM, UMTS).

CROSS-REFERENCE TO RELATED APPLICATION

The present application claims priority under 35 U.S.C. § 119(a) of European Patent Application No. 07 011 582.9, filed on Jun. 13, 2007, the disclosure of which is expressly incorporated by reference herein in its entirety.

The invention claimed is:

1. A process for an own global navigation satellite system and at least one other global navigation satellite system, said process comprising:
   receiving ranging signals including only encrypted navigation data or no navigation data from the at least one other global navigation satellite system;
   processing the received ranging signals from the at least one other global navigation satellite system in a manner similar to the processing of navigation messages from ranging signals of the own global navigation satellite system to compute navigation messages for the at least one other global navigation satellite system for users of the own global navigation satellite system; and
   transmitting the computed navigation messages of the at least one other global navigation satellite system from satellites of the own global navigation satellite system.

2. A process according to claim 1, further comprising:
   up-loading the computed navigation messages of the at least one other global navigation satellite system to respective satellites of the own global navigation satellite system;
   wherein the transmitting comprises disseminating, by the respective satellites, the up-loaded computed navigation messages of the at least one other global navigation satellite system to user receivers of the own global navigation satellite system.

3. A system comprising an own global navigation satellite system and at least one other global navigation satellite system, said system comprising:
   a receiver structured and arranged for receiving ranging signals including only encrypted navigation data or no navigation data from the at least one other global navigation satellite system;
   a processor structured and arranged for processing the received ranging signals from the at least one other global satellite system in a manner similar to the processing of the received ranging signals into navigation messages of the own global navigation satellite system to compute navigation messages for the at least one other global navigation satellite system; and
   a transmitter structured and arranged for transmitting the computed navigation messages of the at least one other global navigation satellite system from satellites of the own global navigation satellite system.

4. A system according to claim 3, further comprising:
   an up-load link structured and arranged for up-loading the computed navigation messages of the at least one other global navigation satellite system to the satellites of the own global navigation satellite system;
   wherein the transmitter is further structured and arranged for disseminating the up-loaded computed navigation messages of the at least one other global navigation satellite system to user receivers of the own global navigation satellite system.

5. An apparatus of a global navigation satellite system comprising:
   a receiver structured and arranged for receiving ranging signals including only encrypted navigation data or no navigation data from at least one global navigation satellite system other than an own global navigation satellite system;
   a processor structured and arranged for processing the received ranging signals from the at least one global navigation satellite system other than an own global navigation satellite system in a manner corresponding to that in which ranging signals of the owned global navigation satellite system are processed into navigation messages of the own global navigation satellite system, thereby computing navigation messages of the at least one global navigation satellite system other than the own global navigation satellite system; and
   an up-load link structured and arranged for up-loading the computed navigation messages of the at least one global navigation satellite system other than the own global navigation satellite system to the respective satellites of the own global navigation satellite system.

* * * * *